United States Patent
Fourmont et al.

(10) Patent No.: US 8,729,764 B2
(45) Date of Patent: May 20, 2014

(54) VARIABLE DAMPING CIRCUIT FOR A SYNCHRONOUS SERVOMOTOR

(75) Inventors: Tony Fourmont, Paris (FR); Franck Delnaud, Paris (FR); Jérôme Piaton, Paris (FR); Roland Casimir, Paris (FR)

(73) Assignee: Sagem Defense Securite, Paris (FR)

( * ) Notice: Subject to any disclaimer, the term of this patent is extended or adjusted under 35 U.S.C. 154(b) by 73 days.

(21) Appl. No.: 13/498,878

(22) PCT Filed: Oct. 7, 2010

(86) PCT No.: PCT/EP2010/006133
§ 371 (c)(1),
(2), (4) Date: Mar. 28, 2012

(87) PCT Pub. No.: WO2011/042186
PCT Pub. Date: Apr. 14, 2011

(65) Prior Publication Data
US 2012/0187874 A1    Jul. 26, 2012

(30) Foreign Application Priority Data

Oct. 9, 2009 (FR) ...................................... 0904863

(51) Int. Cl.
*H02K 23/22* (2006.01)
(52) U.S. Cl.
USPC .............................. 310/183; 318/375; 188/378
(58) Field of Classification Search
USPC ..................... 318/183, 375; 310/183; 188/378
See application file for complete search history.

(56) References Cited

U.S. PATENT DOCUMENTS

| 4,426,606 A | 1/1984 | Suita |
| 5,886,504 A * | 3/1999 | Scott et al. ...................... 322/15 |
| 2004/0160208 A1* | 8/2004 | Youm et al. .................... 318/801 |
| 2008/0150459 A1* | 6/2008 | Alexander et al. ............. 318/376 |
| 2008/0197818 A1* | 8/2008 | Feldtkeller .................... 323/207 |

FOREIGN PATENT DOCUMENTS

DE    10 2004 032680 A1    2/2006

* cited by examiner

*Primary Examiner* — Eduardo Colon Santana
*Assistant Examiner* — Bickey Dhakal
(74) *Attorney, Agent, or Firm* — Muncy, Geissler, Olds & Lowe, P.C.

(57) ABSTRACT

A damper circuit for damping a synchronous servo-motor having at least one winding, at least one main damper resistor, connection means for connecting the main damper resistor in series with the winding, and at least one additional damper cell including at least one additional damper resistor connected in parallel with the main damper resistor via a static switch connected to a control module for controlling the switch as a function of a voltage of the winding. The control module has a shunt in parallel with the main damper resistor. The shunt has an output connected to the control input of the switch and a divider bridge connected to the shunt to form a comparator between the voltage of the winding and a conduction voltage of the shunt.

6 Claims, 2 Drawing Sheets

VARIABLE DAMPING CIRCUIT FOR A SYNCHRONOUS SERVOMOTOR

BACKGROUND OF THE INVENTION

1. Field of the Invention

The present invention relates to a damper circuit for a synchronous servo-motor.

2. Brief Discussion of the Related Art

In the field of aviation, servo-motors are used in systems for controlling flight control surfaces. Such servo-motors are generally used as actuators and dampers, but it is also possible to use them as dampers only. In the damper mode of operation, the movable element of the servo-motor is moved by an external force that generates electrical energy in the windings of the servo-motor, which energy is taken to damper resistors in order to be dissipated therein. The damping as produced in this way obeys a linear relationship of slope that depends directly on the resistance of the resistors.

It can nevertheless be understood that it would be desirable for damping to be greater when the movable element is moved suddenly and quickly.

That is why circuits have been devised that provide a damping relationship that is not linear. It is thus known to provide damping circuits that make use of electromechanical relays. Such relays give rise to problems of size, of weight, and of reliability. Furthermore, they need to be controlled by a control circuit that requires power.

It is also known to provide damper circuits that make use of a programmable logic circuit. Such programmable logic circuits are nevertheless complex and the risks of failure are relatively numerous, so it is very expensive for them to be certified for critical use in the operation of an airplane. In addition, it is preferable to use components that do not need a power supply in order to operate so that damping can be ensured even in the event of a failure of the power supply.

It might be thought that zener type diodes can be connected in series with the damper resistors in order to enable the damper resistors to be connected selectively. Nevertheless, such zener diodes deform the voltage waveform even though it is desirable to conserve a sinusoidal waveform both for the voltage and for the current. Furthermore, the conduction voltages of zener diodes are set by their manufacturers, thereby putting a limit on available values.

SUMMARY OF THE INVENTION

An object of the invention is to provide damper means that are simple and inexpensive.

To this end, the invention provides a damper circuit for damping a synchronous servo-motor having at least one winding, the damper circuit having at least one main damper resistor, connection means for connecting the main damper resistance in series with the winding, and at least one additional damper cell including at least one additional damper resistor connected in parallel with the main damper resistor via a static switch connected to a switch control module. The switch is controlled as a function of the voltage across the terminals of the winding. The control module includes a shunt in parallel with the main damper resistor, which shunt has an output connected to the control input of the switch and a divider bridge connected to the shunt in order to form a comparator between the voltage of the winding and a conduction voltage of the shunt.

Thus, the shunt becomes conductive when the output voltage from the divider bridge is greater than or equal to the conduction voltage and it controls the switch that connects the additional damper resistor in parallel with the main damper resistor. The divider bridge enables activation of the additional damper line to be adjusted in simple manner. This therefore provides a damper relationship having at least two damping slopes: i.e. a slope that corresponds to the resistance of the main damper resistor, and a slope that corresponds to the resistance that results from connecting the main damper resistor in parallel with the additional damper resistor.

By way of example, the shunt is an adjustable regulator arranged in such a manner as to receive a reference voltage and to provide reverse conduction when the reference voltage reaches a conduction voltage. The shunt is connected to the divider bridge in such a manner that the output voltage from the divider bridge constitutes the reference voltage.

This circuit does not require any particular power supply, and it makes use only of components that are simple and well-tried, thus making it particularly robust.

BRIEF DESCRIPTION OF THE DRAWINGS

Other characteristics and advantages of the invention appear on reading the following description of a particular, non-limiting embodiment of the invention.

Reference is made to the accompanying drawings, in which.

DETAILED DESCRIPTION OF THE PREFERRED EMBODIMENTS

Figure 1:
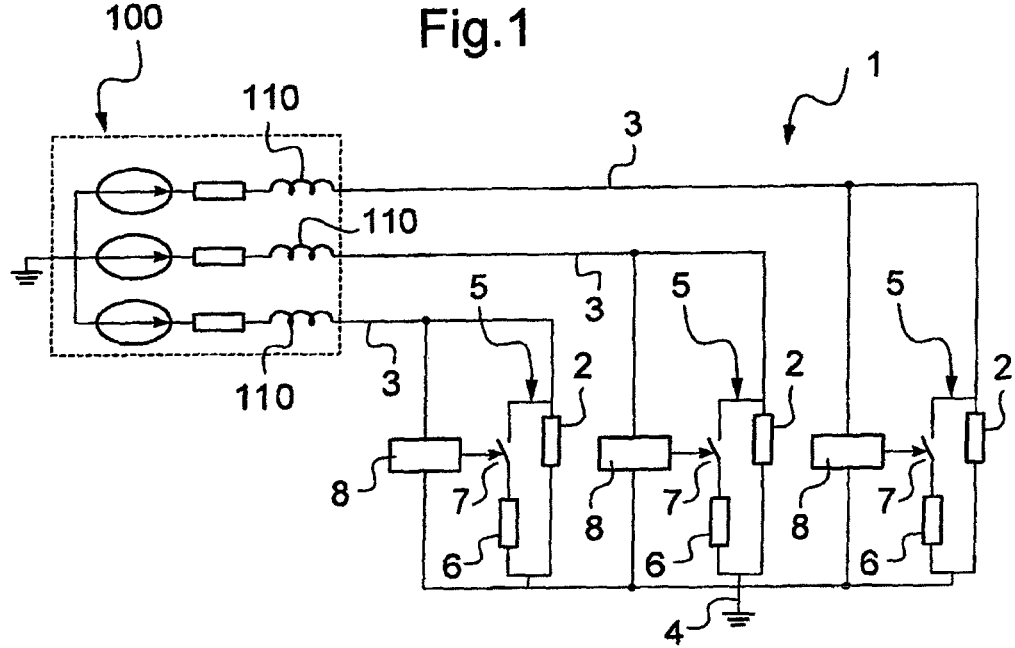
FIG. 1 is a schematic of the damper circuit in accordance with the invention.

With reference to the figures, the invention relates to a damper circuit, given overall reference 1, that is connected to an electric actuator, specifically a servo-motor of the synchronous type, given overall reference 100.

The servo-motor 100 comprises a rotor with permanent magnets (not shown) and a stator having three windings referenced 110. By way of example, the servo-motor is connected by a motion transmission system to a movable flight control surface of an aircraft. When the servo-motor 100 is powered, it moves the movable control surface in response to commands from the pilot of the aircraft. When the servo-motor 100 is not powered, the movement of the movable control surface under the action of an external force, e.g. an aerodynamic force, causes the rotor to move, thereby inducing current in the windings 110, such that the servo-motor 100 operates as a generator. The current is taken to the damper circuit where it is dissipated to damp the movement of the rotor.

For this purpose, the damper circuit 1 includes a main damper resistor 2 for each of the windings 110 and means for connecting the main damper resistor 2 in series with the winding 110. The connection means in this example are constituted merely by lines 3, 4 connecting each main damper resistor 2 to the corresponding winding 110 and to an artificial neutral. The connection means may equally well include a switch enabling the windings 110 to be connected directly to ground without passing via the main damper resistors 2.

The damper circuit 1 also includes two additional damper cells for each winding, these cells being given overall reference 5 and being individualized by means of indices 1 and 2.

The additional damper cell 5.1 has an additional damper resistor 6 connected in parallel with the main damper resistor 2 via a static switch 7 that is connected to a control module 8 for controlling the switch 7 as a function of an output voltage from the winding 110. The additional resistor 6 has a resistance that is not less than that of the main damper resistor 2.

In this example, the static switch 7 is an NPN type bipolar transistor having its emitter connected to the additional damper resistor 6.

In parallel with the main damper resistor 2, the control module 8 includes three branches each having one end connected to the cathode of an input diode 9 that has its anode connected to the line 3, and another end connected directly to the line 4.

The first of the three branches has two resistors 10 and 11 in series so as to form a divider bridge; the second branch has a resistor 12 connected in series with the diode 9 and with the cathode of a programmable zener diode 13 having an anode connected to the line 4; the third branch comprises a PNP type bipolar transistor 14 having its emitter connected to the diode 9 and its collector connected to a resistor 15 that is connected to the line 4. The midpoint of the divider bridge is connected to a reference input of the zener diode 13; the point where the zener diode 13 is connected to the resistor 12 is connected to the control input (the base) of the bipolar transistor 14, and the collector of the bipolar transistor 14 is connected to the control input (the base) of the static switch 7.

The additional damper cell 5.2 has the same components as the additional damper cell 5.1 and it is connected to the lines 3 and 4 the opposite way round relative to the additional damper cell 5.1.

It may be observed that the zener diode 13 forms a shunt with its conduction depending on the output voltage from the divider bridge (which depends on the output voltage from the winding) in such a manner as to form a comparator between the output voltage from the winding and the conduction voltage of the shunt. When the output voltage of the divider bridge is greater than the conduction voltage (when the rotor is rotating at high speed, thereby generating a relatively high voltage in the winding), the shunt conducts and causes the bipolar transistor 14 to conduct, which in turn causes the static switch 7 to conduct, thereby connecting the additional damper resistor 6 in parallel with the main damper resistor 2. When the output voltage from the divider bridge is less than the conduction voltage (as applies for a relatively slow speed of the rotor), the shunt does not conduct and causes the bipolar transistor 14 to be non-conductive, in turn causing the static switch 7 to be non-conductive, thereby disconnecting the additional damper resistor 6 from the main damper resistor 2.

Because of the presence of the input diode 9, the damper cells 5.1 and 5.2 are active respectively when the output voltage from the winding is positive and when the output voltage from the winding is negative.

Naturally, the invention is not limited to the embodiment described but covers any variant coming within the ambit of the invention as defined in the claims.

Figure 3:
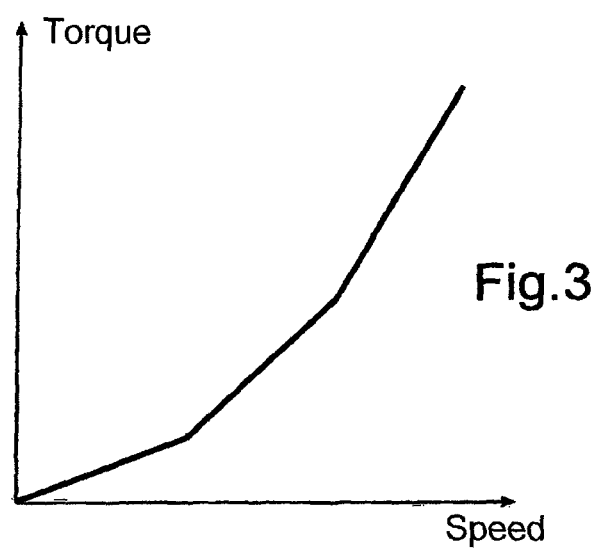
FIG. 3 is a graph with a curve showing the damping relationship obtained in a variant of the invention, with rotor speed plotted along the abscissa axis and damping plotted up the ordinate axis.
Figure 2:
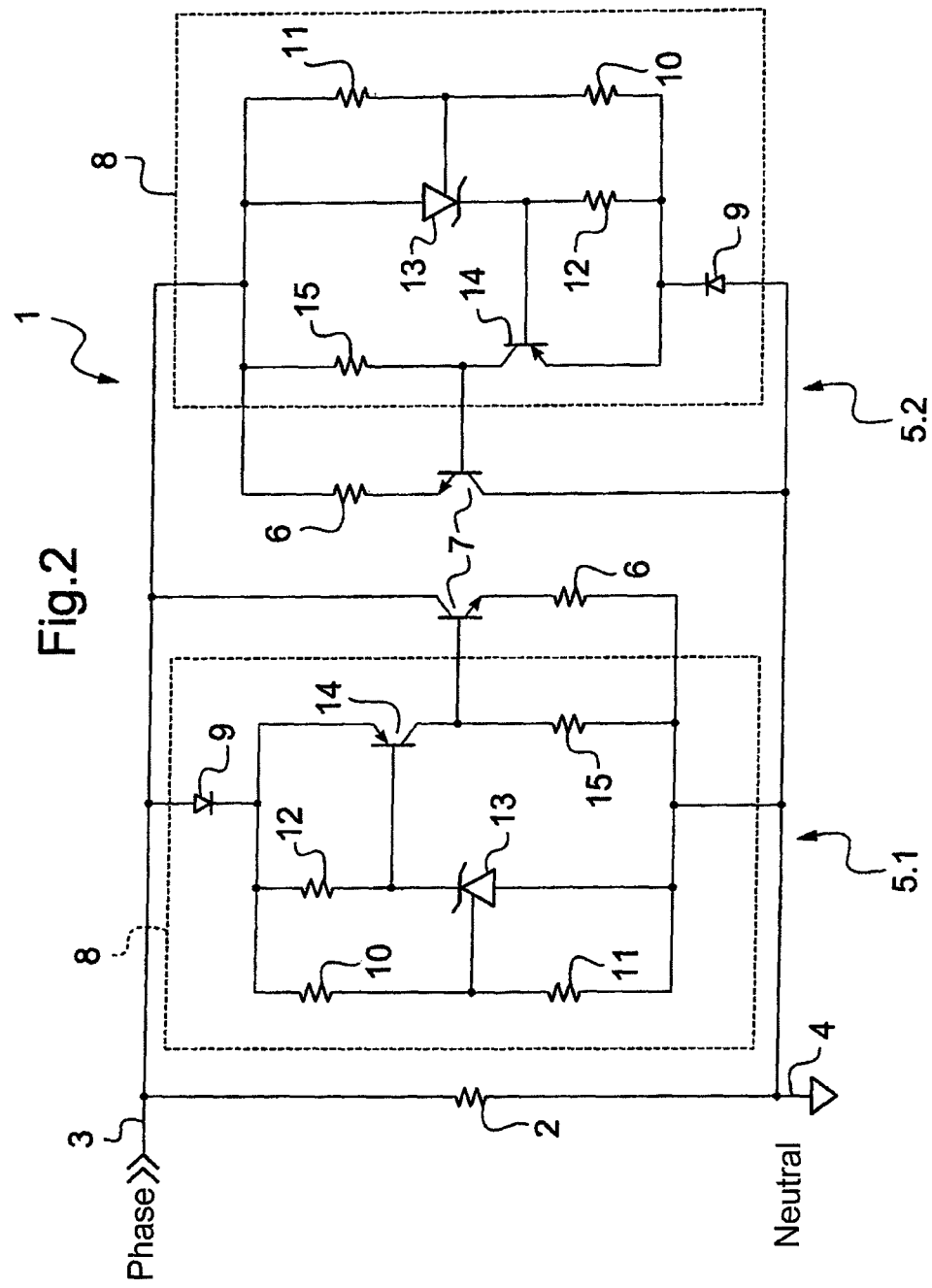
FIG. 2 is a detail view of a portion II of FIG. 1.

In particular, the circuit may have more than two additional damper cells per winding in order to provide a damping relationship that has more than two slopes. This makes it possible to have a damping relationship of a shape that is close to that of a parabola (see FIG. 3).

It is also possible to envisage having a circuit that includes only one additional damper cell per winding so as to provide damping only when the voltage is positive or negative. In addition, it is not essential for an additional damper cell to be connected to each of the windings.

In a variant, the divider bridge includes at least one variable resistor to make it possible to adjust the voltage across the terminals of the winding from which the additional damper cells are connected.

The number of resistors may be different from the number described and the structure of the three parallel branches of the control module 8 may also be different.

Other types of static switch may be used instead of the bipolar transistors 7 and 14.

The invention claimed is:

1. A damper circuit for damping a synchronous servomotor, comprising:
    at least one winding;
    at least one main damper resistor;
    connection means for connecting the main damper resistor in series with the winding; and
    at least one damper cell having at least one additional damper resistor connected in parallel with the main damper resistor via a static switch connected to a control module for controlling the switch as a function of a voltage of the winding;
    wherein the control module comprises, in parallel with the main damper resistor, a shunt having an output connected to a control input of the switch and a divider bridge connected to the shunt in order to form a comparator between the voltage of the winding and a conduction voltage of the shunt.

2. A damper circuit according to claim 1, wherein the divider bridge includes at least one variable resistor.

3. A damper circuit according to claim 1, including two additional damper cells that are identical but mounted opposite ways round, each damper cell having an input diode so as to be active respectively when the voltage of the winding is positive and when the voltage of the winding is negative.

4. A damper circuit according to claim 1, wherein the control module has three branches in parallel with the main damper resistor, comprising:
    a first branch having two resistors in series to form the divider bridge;
    a second branch with the shunt; and
    a third branch with a static switch;
    wherein the divider bridge having a midpoint connected to a reference input of the shunt;
    wherein the shunt is connected to the static switch of the third branch in order to control it, and the static switch of the third branch being connected to a static switch connected to the additional damper resistor.

5. A damper circuit for damping a synchronous servomotor, comprising:
    at least one winding;
    at least one main damper resistor;
    connection means for connecting the main damper resistor in series with the winding; and
    at least one damper cell having at least one additional damper resistor connected in parallel with the main damper resistor via a static switch connected to a control module for controlling the switch as a function of a voltage of the winding;
    wherein the control module comprises, in parallel with the main damper resistor, a shunt having an output connected to a control input of the switch and a divider bridge connected to the shunt in order to form a comparator between the voltage of the winding and a conduction voltage of the shunt;
    wherein the damper circuit comprises two additional damper cells that are identical but mounted opposite ways round, each damper cell having an input diode so as to be active respectively when the voltage of the winding is positive and when the voltage of the winding is negative.

6. A damper circuit for damping a synchronous servo-motor, comprising:

at least one winding;

at least one main damper resistor;

connection means for connecting the main damper resistor in series with the winding; and at least one damper cell having at least one additional damper resistor connected in parallel with the main damper resistor via a static switch connected to a control module for controlling the switch as a function of a voltage of the winding;

wherein the control module comprises a shunt in parallel with the main damper resistor, the shunt having an output connected to a control input of the switch and a divider bridge connected to the shunt in order to form a comparator between the voltage of the winding and a conduction voltage of the shunt;

wherein the control module has three branches in parallel with the main damper resistor, comprising:

a first branch having two resistors in series to form the divider bridge;

a second branch with the shunt; and a third branch with a static switch;

wherein the divider bridge having a midpoint connected to a reference input of the shunt; the shunt being connected to the static switch of the third branch in order to control it, and the static switch of the third branch being connected to a static switch connected to the additional damper resistor.

* * * * *